US006955095B2

(12) United States Patent
Drube et al.

(10) Patent No.: US 6,955,095 B2
(45) Date of Patent: Oct. 18, 2005

(54) ACCURATE CRYOGENIC LIQUID DISPENSER

(75) Inventors: Thomas K. Drube, Lakeville, MN (US); Paul A. Drube, Burnsville, MN (US); Claus D. Emmer, Prior Lake, MN (US); Gilbert J. Bily, Montgomery, MN (US); Jesse Gamble, Burnsville, MN (US)

(73) Assignee: Chart Inc., Burnsville, MN (US)

( * ) Notice: Subject to any disclaimer, the term of this patent is extended or adjusted under 35 U.S.C. 154(b) by 0 days.

(21) Appl. No.: 10/805,997

(22) Filed: Mar. 22, 2004

(65) Prior Publication Data

US 2004/0231411 A1 Nov. 25, 2004

Related U.S. Application Data

(62) Division of application No. 10/366,743, filed on Feb. 13, 2003, now Pat. No. 6,732,594, which is a division of application No. 09/632,604, filed on Aug. 4, 2000, now Pat. No. 6,595,048.

(51) Int. Cl.$^7$ ................................................. G01F 1/58
(52) U.S. Cl. ................................... 73/861.14; 73/195
(58) Field of Search ............................ 73/19.01, 195, 73/861.01, 861.02, 861.15, 861.04, 861.14

(56) References Cited

U.S. PATENT DOCUMENTS 3,933,030 A * 1/1976 Forster et al. ............... 73/32 R
3,958,443 A * 5/1976 Berrettini .................. 73/861.01
4,801,375 A * 1/1989 Padilla ........................ 210/100
4,835,456 A * 5/1989 Liu et al. .................. 73/861.02
5,616,838 A * 4/1997 Preston et al. ................ 73/195
5,682,750 A * 11/1997 Preston et al. ............... 62/50.2
6,314,981 B1 * 11/2001 Mayzou et al. .......... 137/15.04

* cited by examiner

*Primary Examiner*—Harshad Patel
*Assistant Examiner*—Takisha Miller
(74) *Attorney, Agent, or Firm*—DLA Piper Rudnick Gray Cary US LLP

(57) ABSTRACT

A system for dispensing cryogenic liquid to a use device includes a bulk storage tank providing LNG to a sump containing a meter submerged in LNG. A temperature probe is also submerged in the LNG. A dispensing line is positioned between the meter and dispensing hose and includes a dispensing valve. A drain line bypasses the dispensing valve and features a check valve so that LNG trapped in the hose after dispensing is returned to the sump due to pressurization by ambient heat. A capacitance probe is submerged in the LNG in the sump and provides a dielectric that is compared by a microprocessor with the dielectric for pure methane at the same temperature to determine the purity of the LNG. An approximate linear relation between density and dielectric may be used to determine density and mass flow for the LNG from the measured dielectric. Alternatively, a density compensation factor based upon the dielectrics may be calculated and applied to the density of pure methane to obtain the density and mass flow of the LNG. A further alternative embodiment substitutes a compensating meter for the capacitor and the equations for the resulting two meters may be solved to determine density and mass flow for the LNG.

4 Claims, 6 Drawing Sheets

ACCURATE CRYOGENIC LIQUID DISPENSER

CROSS REFERENCE TO RELATED APPLICATIONS

This application is a divisional application of U.S. patent application Ser. No. 10/366,743, filed on Feb. 13, 2003 U.S. Pat. No. 6,732,594, which is a divisional application of U.S. patent application Ser. No. 09/632,604, filed on Aug. 4, 2000, issued as U.S. Pat. No. 6,595,048.

BACKGROUND OF THE INVENTION

The present invention relates generally to delivery systems for cryogenic liquids and, more particularly, to a system for dispensing and accurately metering a cryogenic liquid, such as liquid natural gas, to a use device.

Liquid natural gas (LNG) is a plentiful, environmentally friendly and domestically available energy source and, therefore, is an attractive alternative to oil. As a result, LNG is increasingly being used as a fuel for vehicles. This is especially true for fleet and heavy duty vehicles.

A key issue in the commercialization of LNG is the ability to accurately meter and dispense it. The National Institute of Standards and Technology of the United States Department of Commerce has developed guidelines for federal Weights and Measures certification whereby dispensed LNG must be metered on a mass flow basis with an accuracy of plus or minus 1.5% for the quantity of product dispensed. Given the potential for widespread use of LNG, a great need exists for a LNG dispensing system that is capable of Weights and Measures certification.

The mass flow of a liquid can be determined by measuring its volumetric flow and then applying a density factor for the liquid. Such an approach is utilized by the cryogenic liquid dispenser system disclosed in U.S. Pat. No. 5,616,838 to Preston et al. The dispenser disclosed in the Preston et al. '838 patent features a meter and a temperature sensor submerged within LNG that partially fills a sump. LNG from the sump is dispensed through the meter and the sump is supplied from a bulk supply tank so that the LNG in the sump is maintained at the proper level. The volumetric flow rate from the meter and the temperature from the sensor are supplied to a microprocessor whereby the mass flow rate of the dispensed LNG may be calculated.

The accuracy of the system of the Preston et al. '838 patent is limited, however, due to the fact that LNG is made up of many chemical components. More specifically, while the methane content of LNG is typically well above 90%, the balance includes substances such as ethane, propane, butane, nitrogen, hydrogen, carbon monoxide, oxygen and sulfur. As a result, the density of LNG cannot be determined with a high degree of accuracy simply by the conventional temperature correlations, which are based upon an approximation of the LNG composition.

The Preston et al. '838 patent also discloses that a pair of submerged pressure sensors may be substituted for the sump temperature sensor and that the pressure differential measured thereby may be used by the microprocessor in combination with the volumetric flow rate to determine density. Such an arrangement, however, presents stability issues in that the signals provided to the microprocessor by the pressure sensors have proven to be erratic.

The use of capacitors for measuring the dielectric of a cryogenic liquid, and the use of this data for calculating the density of the liquid, is also known. Systems employing this approach are disclosed in U.S. Pat. No. 3,933,030 to Forster et al. and U.S. Pat. No. 4,835,456 to Liu et al. The system of the Forster et al. '030 patent requires a redundancy of capacitance probes and fails to indicate the purity of the dispensed product. Furthermore, the system determines the density of the product being dispensed from the measured dielectrics based solely upon an approximation of the Clausius-Mosotti constant for the product. As such, the system of the Forster et al. '030 patent fails to provide density measurements that are adjusted to compensate for variations in the purity of the product being dispensed. This disadvantage adversely impacts the accuracy that is obtainable with the system.

The system of the Liu et al. '456 patent uses a number of complex calculations to obtain the density of the product being dispensed from measured dielectrics for the product. More specifically, the system of the Liu et al. '456 patent implements a rigorous application of molecular dielectric theory using a dielectric susceptibility function in the application of the Clausius-Mosotti formula and the quantitation of a susceptibility parameter. The approach of the system, however, requires sophisticated, complex and expensive measurement and computational equipment.

Accordingly, it is an object of the present invention to provide a cryogenic liquid dispensing system that meters the amount of product dispensed on a mass flow basis.

It is another object of the present invention to provide a cryogenic liquid dispensing system that can accurately meter mixtures of cryogenic liquids.

It is another object of the present invention to provide a cryogenic liquid dispensing system that meters the amount of product dispensed with high enough accuracy that the system may be federal Weights and Measures certified.

It is still another object of the present invention to provide a cryogenic liquid dispensing system that provides an indication when the purity of the cryogenic liquid that is to be dispensed falls below a predetermined level.

It is still another object of the invention to provide a cryogenic liquid dispensing system that may be constructed with low complexity and cost.

SUMMARY OF THE INVENTION

The present invention is directed to a cryogenic liquid dispensing system for use, for example, in dispensing LNG to a vehicle. The system includes a bulk storage tank containing a supply of LNG. A sump is in communication with the bulk storage tank and contains a volumetric flow meter submerged in LNG to avoid two-phased flow through the meter. A temperature probe and a capacitor are also submerged in the LNG in the sump. The meter communicates with a dispensing hose via a dispensing line that includes a dispensing valve. A drain line bypasses the dispensing valve and features a check valve so that LNG trapped in the hose after dispensing is forced back into the sump due to an increase in pressure as a result of ambient heating.

A microprocessor communicates with the meter, dispensing valve, temperature probe and capacitor and contains dielectric data for pure methane over a range of LNG temperatures. The microprocessor uses the temperature from the temperature probe to select a corresponding dielectric for pure methane. This dielectric is compared with the dielectric measured by the capacitor and, if the difference is outside of a predetermined range, the LNG is considered too impure and is not dispensed. In one embodiment of the system, the microprocessor is also programmed with an approximate linear relationship between density and dielectric for LNG. The dielectric measured by the capacitor is used with the relationship to determine the density of the LNG.

Alternatively, the microprocessor may contain density data for pure methane over a range of LNG temperatures and an algorithm for computing a density compensation factor that is a function of the dielectric measured by the capacitor and the dielectric for pure methane. The microprocessor uses the temperature from the temperature probe to obtain a density for pure methane. The density compensation factor is calculated and applied to the density for pure methane to arrive at the density for the LNG.

In a further embodiment of the system, a compensating meter is substituted for the capacitor. The resulting two meters have different equations for relating mass flow to density. As a result, the equations may be solved to determine the mass flow and density of the LNG. The density of pure methane at the temperature of the LNG and the measured density of the LNG may be compared to determine the purity of the LNG.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 1:
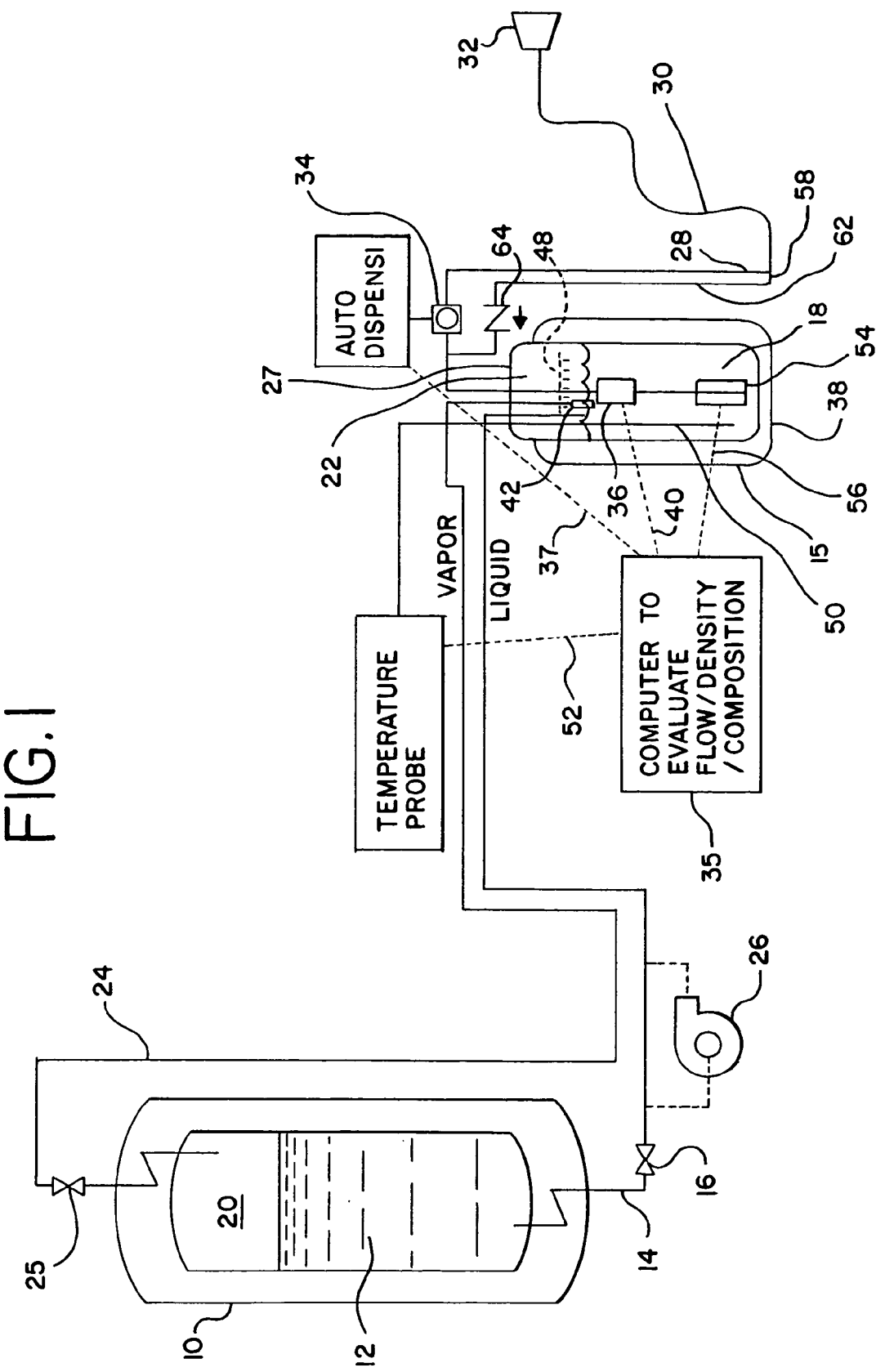
FIG. 1 is a schematic of an embodiment of the cryogenic liquid dispensing system of the present invention.

FIG. 1 illustrates a cryogenic liquid dispensing system that is constructed in accordance with the present invention. The system delivers a metered quantity of cryogenic liquid to a use device, such as a vehicle. While the remaining portion of the discussion will refer to Liquid Natural Gas (LNG) as the cryogenic liquid, it is to be understood that the invention could be used to dispense alternative cryogenic liquids.

The system of FIG. 1 includes a jacket-insulated bulk storage tank 10 for storing a large volume of LNG 12. An insulated line 14 connects the storage tank to 10 to a meter sump 15 and includes a shut-off valve 16. Meter sump 15 is partially filled with LNG 18 and the vapor spaces 20 and 22 of storage tank 10 and meter sump 15, respectively, are connected by a vapor return line 24, which also includes a shut-off valve 25. Meter sump 15 features a jacketed construction for insulation purposes and a removable lid 27 to allow service access.

A cryogenic liquid pump 26 is incorporated in line 14 to initiate transfer of LNG from the system to a use device. Alternatively, the transfer may be accomplished by pressure differentials between the storage tank 10 and the use device tank or the meter sump 15 and the use device tank. When dispensing commences, LNG flows from meter sump 15, through line 28 and dispensing hose 30 and into the use device. Dispensing hose 30 terminates in a quick-disconnect coupling 32 that may be removably connected to a corresponding coupling on the use device. Dispensing line 28 is provided with an automatic dispensing valve 34, which is communication with a computer, such as microprocessor 35, via line 37.

A volumetric flow meter 36 suitable for use with cryogenic liquids is positioned in communication with dispensing line 28 and within the interior chamber 38 of meter sump 15 so as to be submersed within the cryogenic liquid 18 stored therein. As a result, the meter is cooled to the ultra-low temperature of the LNG flowing through it so that two-phase flow is avoided. This aids in ensuring consistent density during the metering process. The meter 36 is also in communication with microprocessor 35 via line 40.

A liquid level control device 42 is positioned on vapor return line 24 and maintains the desired level of LNG in the sump 15 to ensure that the meter 36 is continuously immersed in LNG during use. When the level of LNG in the sump 15 drops below the desired level, device 42 vents gas from sump vapor space 22 to storage tank vapor space 20 via line 24 thereby permitting additional LNG to enter chamber 38 via line 14. Such an arrangement ensures that only liquid is delivered through meter 36. The refilling of the sump stops when the level of LNG in the sump again rises to the desired level because the device 42 stops the return of vapor to tank 10. A float device 42 suitable for use with the present invention is manufactured by Armstrong Machine Works, Three Rivers, Michigan, Model 11-AV. Further details of the operation of the float device 42 may be obtained by reference to U.S. Pat. No. 5,616,838 to Preston et al., which is co-owned by the present applicant. Another possibility, suitable for use with the invention, is a differential pressure switch and a valve controlled thereby. Such an arrangement may be substituted for the float device 42.

Another alternative to liquid level control device 42 is the provision of a spray fill, such as spray bar 48 illustrated in phantom in FIG. 1, for the liquid line 14. The sprayed liquid entering the sump establishes a saturated gas condition so that the pressure head in vapor space 22 is collapsed. As a result, the sump is refilled in a gas/liquid equilibrium state. Once the liquid level in the sump reaches the spray bar 48, the spray is lost and the pressure in vapor space 22 increases so that the net flow into the sump stops.

A temperature probe 50 is submersed within the LNG 18 of sump 15 and communicates with microprocessor 35 via line 52. An open air type capacitor 54 is also submersed in the LNG and communicates with microprocessor 35 via line 56. The open air capacitor preferably features a concentric tube arrangement. Such capacitors are available from present assignee. The capacitor is preferably located near the bottom of the sump 15 so that bubbles generated by heat are eliminated. The dielectric of the LNG between the capacitor walls is obtained and fed to the microprocessor while the temperature of the LNG is provided to the microprocessor from the temperature probe.

Figure 2:
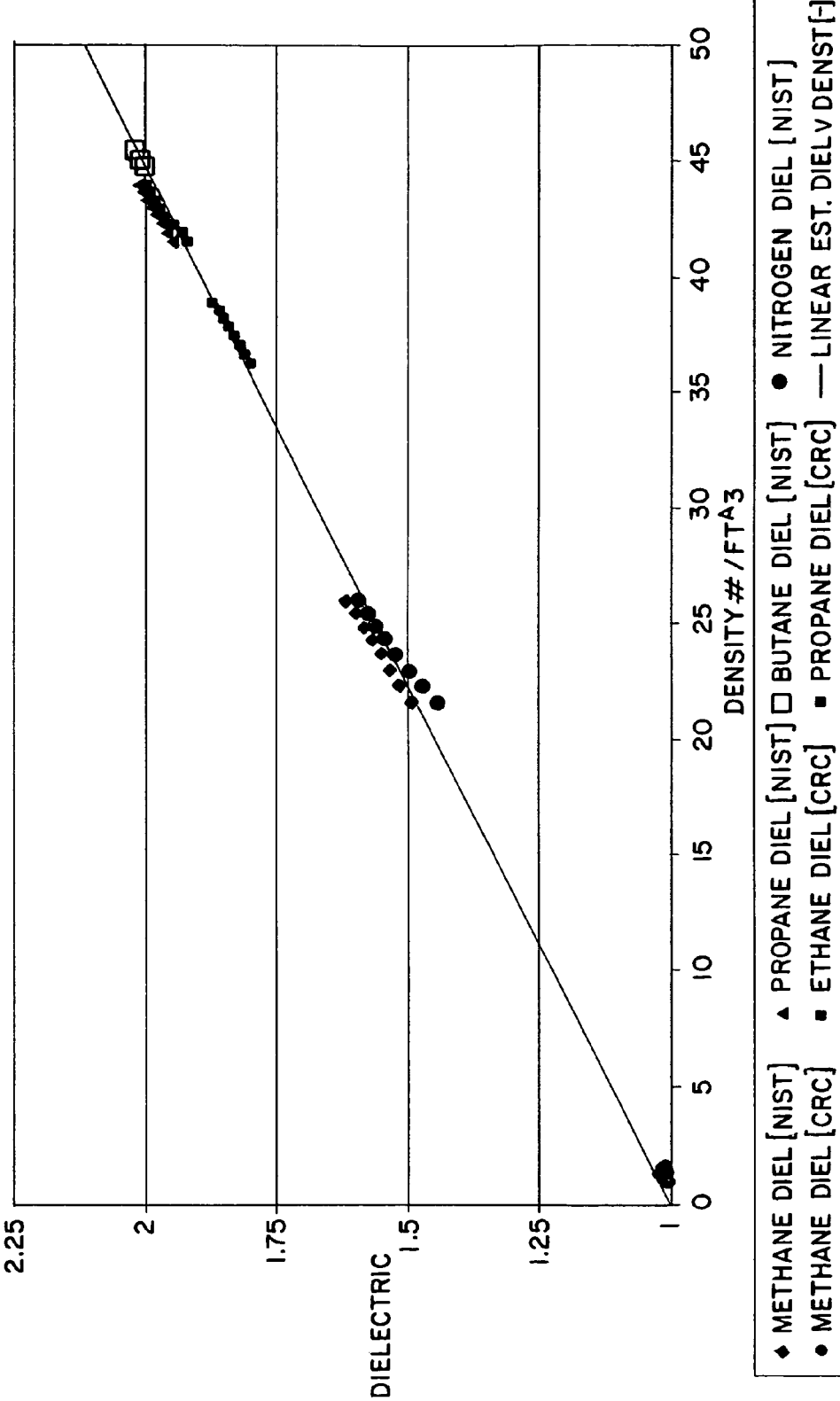
FIG. 2 is a graph illustrating the linear relationship of density to dielectric for typical LNG temperatures.

A plot of dielectric vs. density for pure cryogenic liquids methane, propane, ethane, butane and nitrogen over a range of LNG temperatures is presented in FIG. 2. An example of such a range is −260° F. to −180° F. As is known in the art, the dielectric and density data for the pure substances may be obtained from a variety of sources including the CRC Handbook of Chemistry and Physics (CRC in FIG. 2) and the National Institute of Standards and Technology (NIST in FIG. 2). As illustrated in FIG. 2, the data allows an estimated linear relationship between the dielectrics and densities to be plotted. This estimated linear relationship may be programmed into microprocessor 35.

In addition to the linear relationship of FIG. 2, density and dielectric data for pure methane for a range of LNG temperatures is programmed into a look-up table or some other type of database in the microprocessor memory.

Figure 3:
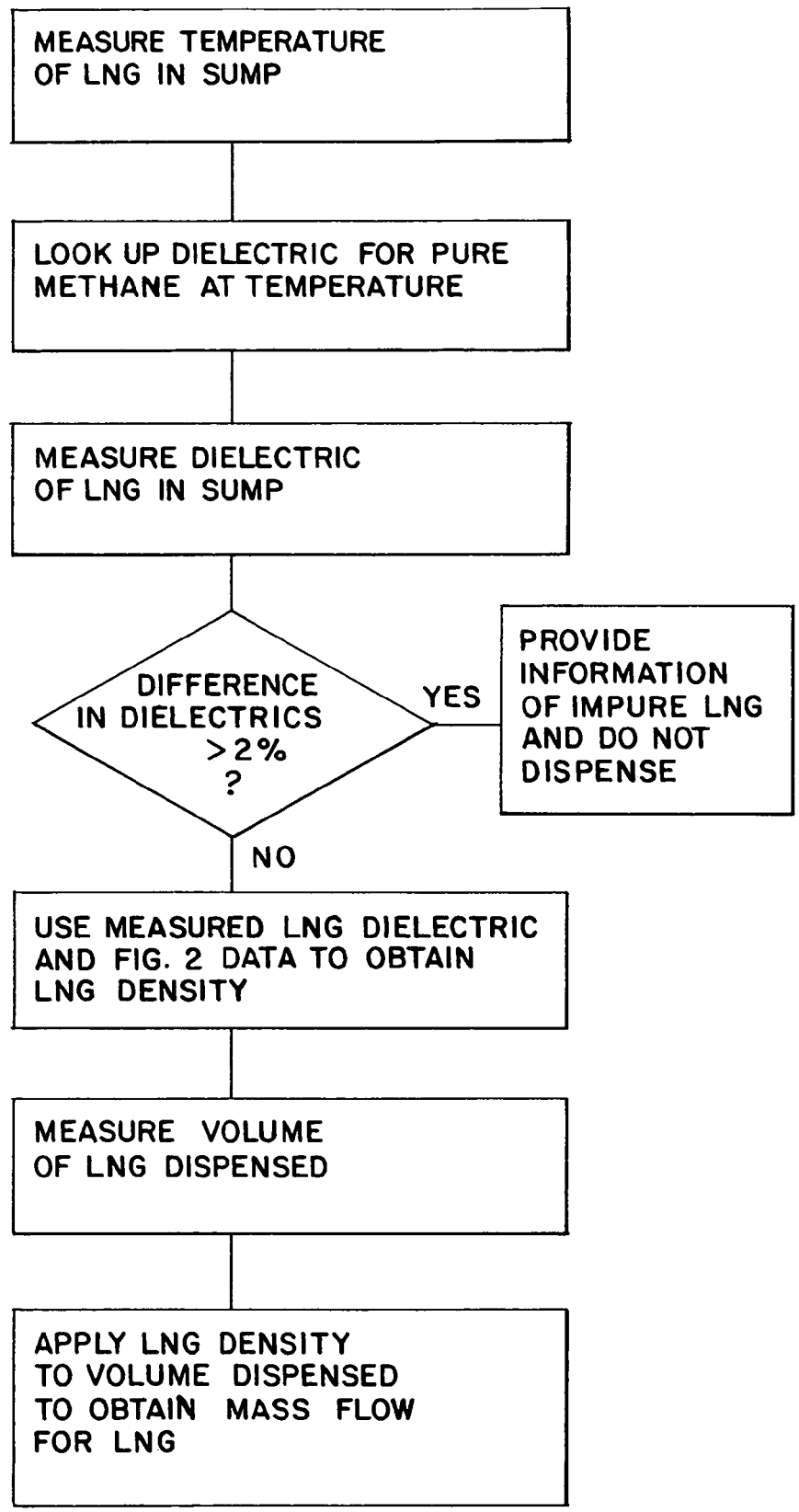
FIG. 3 is a flow diagram showing the steps of the software program of the microprocessor of FIG. 1.

Once microprocessor 35 has been properly programmed, it will test the purity of the LNG in the sump and determine the density by following the program steps illustrated in FIG. 3. More specifically, the temperature of the LNG in the sump is provided via temperature probe 50 to the microprocessor. The microprocessor may then determine the dielectric for pure methane via the look-up table. The dielectric of the LNG in the sump is provided to the microprocessor from capacitor 54.

The microprocessor next compares the dielectric for pure methane at the temperature of the LNG in the sump with the dielectric of the LNG in the sump. As stated previously, the methane content of LNG is typically well above 90%. It has been determined that relatively pure LNG will have a dielectric that is close to that of liquid methane at LNG dispensing temperatures. As a result, a window for acceptable LNG purity may be established such that if the dielectric of the LNG in the sump differs significantly from the dielectric of pure methane for the measured temperature, an indication of the presence of impure LNG is provided by the microprocessor such as through visual or audio means and the dispensing of LNG is prevented via microprocessor control of valve 34. An example of an acceptable range of deviation in dielectrics is +2% to −0%. The outer limit of this range corresponds to LNG having a composition that is 90% methane and 10% ethane.

Methane and other substances typically present in LNG, such as liquid propane, ethane, butane and nitrogen, are comprised of non-polar molecules. It should be noted that when substances comprised of polar molecules, such as propylene, are present in LNG in greater than trace amounts, the dielectric of the LNG will be significantly higher. Generally such polar constituents of LNG can upset the performance of the use device engine. As a result, the system of the present invention detects and prevents the dispensing of LNG when such substances are present and potentially harmful to the use device.

If the LNG is of acceptable purity, valve 34 permits dispensing and a volumetric flow for the dispensed LNG is obtained from meter 36. The measured dielectric for the LNG may be used with the data of FIG. 2 to obtain the approximate density of the LNG. As is known in the art, microprocessor 35 then uses the density for the LNG and the volumetric flow rate to compute the mass flow for the dispensed LNG.

Figure 4:
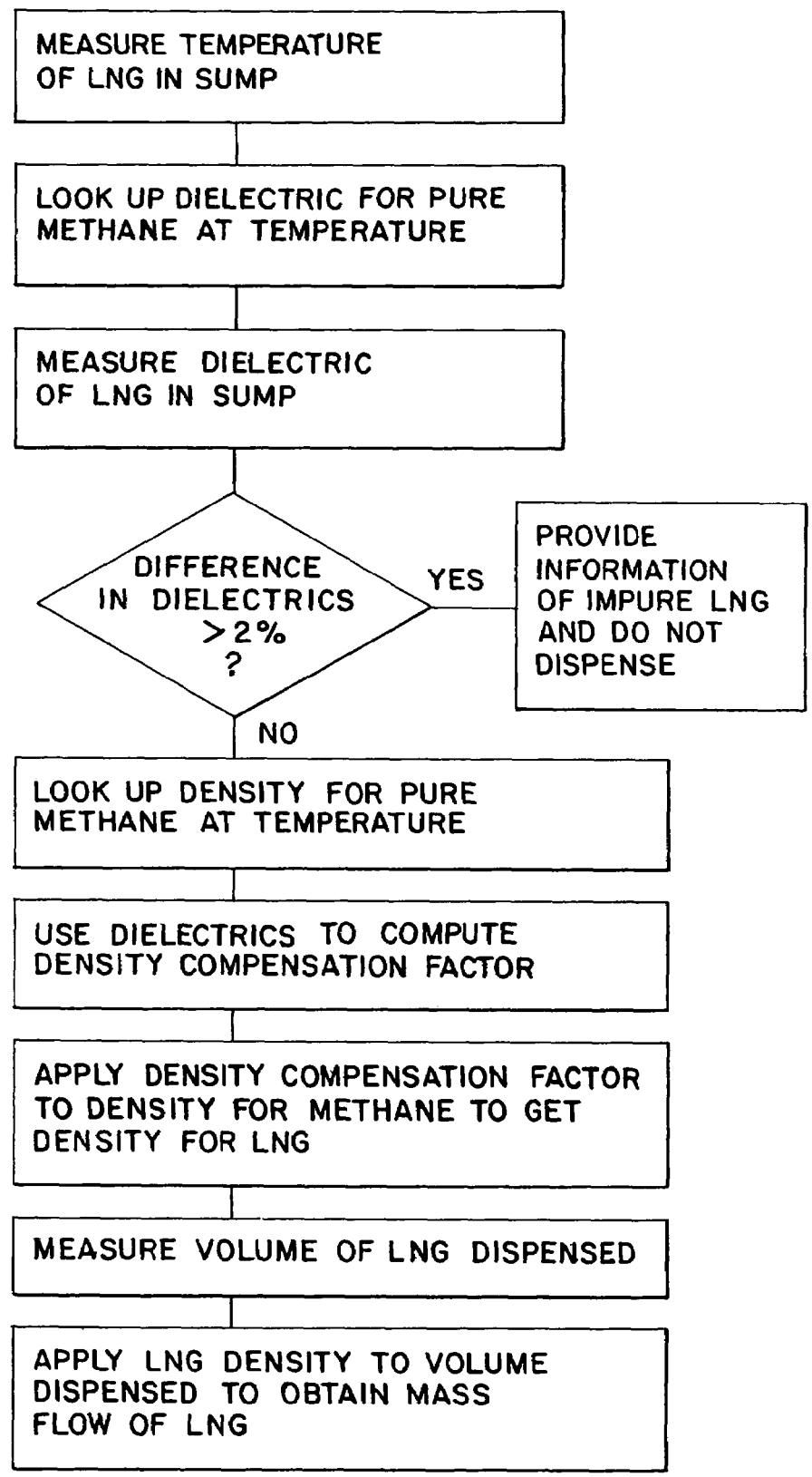
FIG. 4 is a flow diagram showing the steps of an alternative software program of the microprocessor of FIG. 1.

The microprocessor 35 may use the programming illustrated in FIG. 4 as an alternative to that illustrated in FIG. 3 to obtain the mass flow for the dispensed LNG. While the density and dielectric data for pure methane for LNG temperatures is still programmed into microprocessor 35 with the approach of FIG. 4, the linear relationship of FIG. 2 is not. Instead, the following algorithm is programmed into the microprocessor:

Where:
$F_{corr}$=density compensation factor
$diel_{measured}$=measured dielectric of LNG in sump
$diel_{others}$=dielectric of assumed constituent(s) in LNG other than methane at temperature T of LNG in sump
$diel_{methane}(T)$=dielectric of pure methane at temperature T of LNG in sump $\rho(T)$=density of pure methane at temperature T of LNG in sump While ethane preferably is the assumed constituent in the LNG other than methane, alternatives include pure propane, another pure non-polar molecular substance or a mixture of non-polar molecular substances. Dielectric data for the assumed constituent(s) corresponding to a range of LNG temperatures is also programmed into the microprocessor for use in the density compensation factor equation. Once computed, the density compensation factor is multiplied by the density of pure methane at the temperature T of the LNG in the sump to arrive at a close approximation of the density of the LNG in the sump.

The first four steps performed by the microprocessor in FIG. 4 are identical to those in FIG. 3. Once the system tests the LNG for purity, however, the approach of FIG. 4 differs from that of FIG. 3. More specifically, as illustrated in FIG. 4, the microprocessor uses the temperature T from the sump, measured with temperature probe 50, to obtain the density of pure methane from a look-up table or other database. The microprocessor also calculates the density compensation factor using the dielectric for pure methane (at the temperature T of the sump LNG), the sump LNG dielectric and the above equation. The density compensation factor is then applied to the density for pure methane to determine a close approximation of the density for the LNG in the sump. The volumetric flow for the dispensed LNG is obtained from meter 36 and the approximate density of the LNG is applied to the volumetric flow to arrive at the mass flow for the dispensed LNG.

When dispensing of LNG ceases, and dispensing valve 34 is closed, an undelivered volume of LNG remains in the system dispensing hose 30 of FIG. 1. Ambient heating will require that the resulting LNG vapors in the hose be vented. In addition, an unknown volume of LNG remaining in the dispensing hose undermines the meter accuracy for the next dispensing. Accordingly, it is desirable that the hose be empty at the commencement of dispensing, that is, that the system provide a "dry hose." As illustrated in FIG. 1, the system of the present invention provides this by the inclusion of a drain line 62 connected on opposite sides of dispensing valve 34. One end 58 of drain line 62 is connected at the lowest point along dispensing line 28 and hose 30 between the sump 15 and the quick-disconnect coupling 32. Drain line 62 is also provided with a check valve 64 to prevent LNG from sump 15 bypassing closed dispensing valve 34.

In operation, at the end of a dispensing, the dispensing valve 34 is closed and ambient heat pressurizes the LNG trapped in the hose 30 so that the liquid is quickly forced through drain line 62, check valve 64 and back into sump 15. If the connection between the dispensing line 28 and hose 30 and drain line 62 was not at the lowest point between sump 15 and coupling 32, the LNG would only transfer out of the hose as a gas. This could possibly and undesirably leave LNG in the hose at the commencement of the next dispensing.

Figure 5:
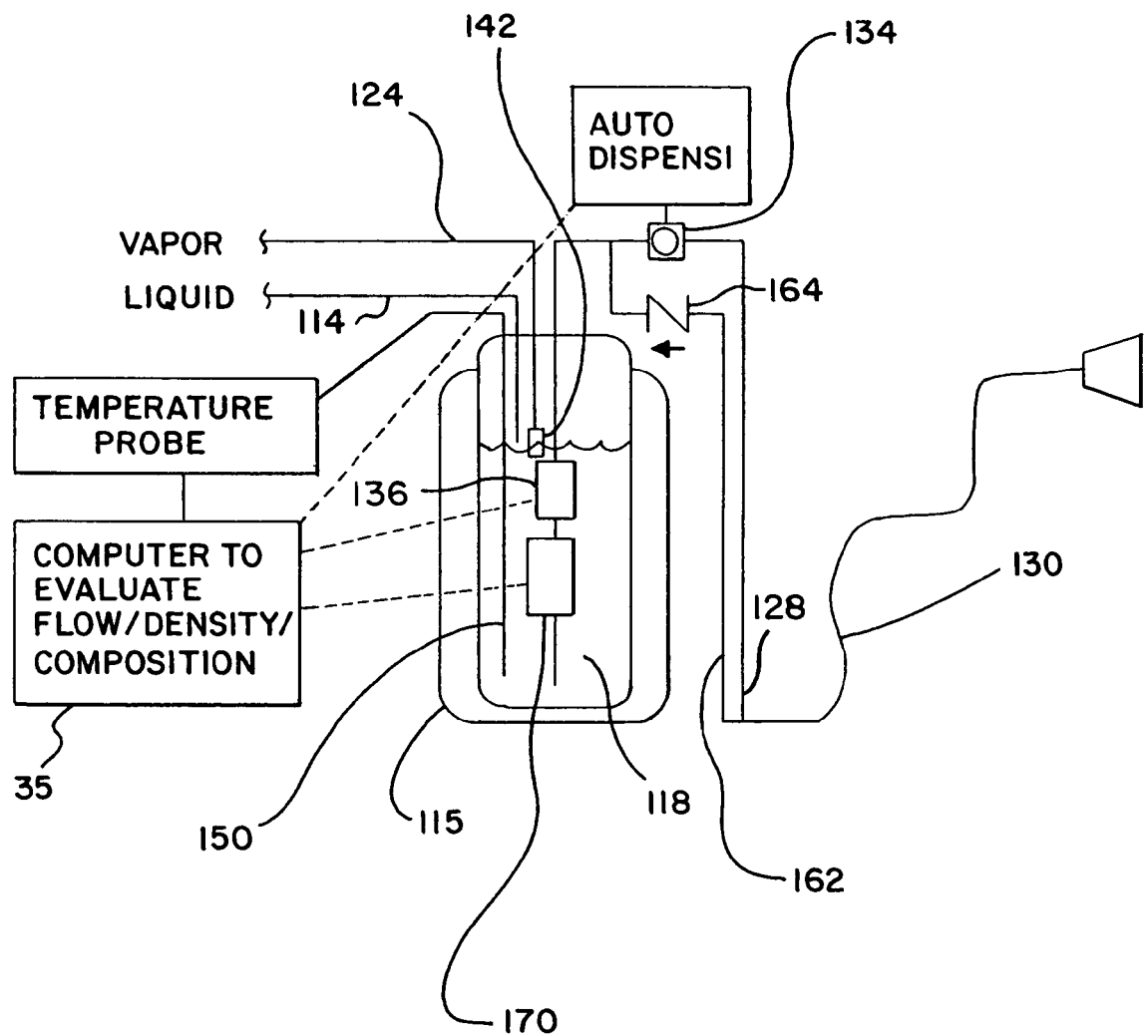
FIG. 5 is a schematic of the sump and dispensing hose portion of an alternative embodiment of the cryogenic liquid dispensing system of the present invention.

The sump and dispensing line and hose portions of an alternative embodiment of the dispensing system of the present invention are illustrated in FIG. 5. As with the embodiment of FIG. 1, LNG is maintained within the sump 115 at a desired level via the cooperation of insulated line 114, vapor return line 124 and liquid level control device 142, all of which communicate with a bulk storage tank and pump arrangement of the type illustrated in FIG. 1. As with the embodiment of FIG. 1, the system also includes a dispensing line 128 and hose 130 with drain line 162 and check valve 164 provided to ensure a dry hose condition at the commencement of dispensing.

While the embodiment of FIG. 5 also includes a temperature probe 150 to determine the temperature of LNG 118 and a primary flow meter 136, a compensating flow meter 170 is substituted for the open-air capacitor 54 of FIG. 1. The primary and compensating meters each measure the flow of dispensed LNG but relate mass flow to density through equations of different form. For example, the primary meter 136 may be a differential pressure/orifice meter wherein the measured mass flow is proportional to the square root of density. In contrast, the compensating meter may be a turbine meter wherein the measured mass flow is proportional to density. Since the equations have different forms, they can be combined to solve for density as illustrated below:

For primary meter: $M = K_{orifice}(\rho \times \Delta P)^{1/2}$

For compensating meter: $M = \rho \times K_{turbine} \times \text{Frequency}$

Combining equations: $\rho = \{(K_{orfice} \times \Delta P^{1/2})/(K_{turbine} \times \text{Frequency})\}^2$ Where:
M=mass flow of LNG through meter
$\rho$=density of LNG flowing through meter
$K_{orifice}$=meter calibration constant
$\Delta P$=pressure drop measured by primary meter
$K_{turbine}$=meter calibration constant
Frequency=frequency measured by compensating meter As a result, once the density for the dispensed LNG is determined, the mass flow may be determined from either one of the above mass flow equations.

Figure 6:
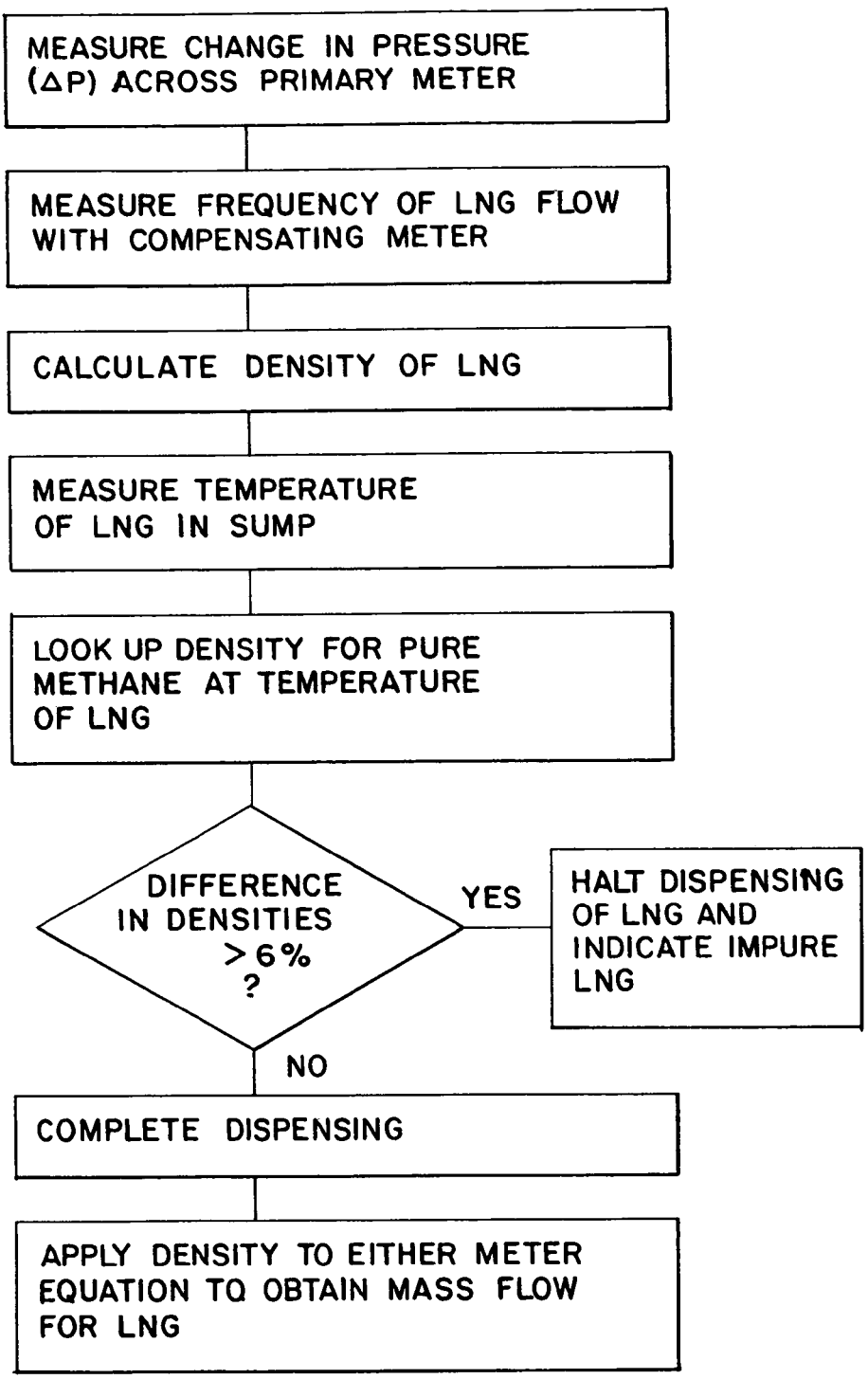
FIG. 6 is a flow diagram showing the steps of the software program of the microprocessor of FIG. 5.

In order to perform the above calculations, which are illustrated in the flow diagram of FIG. 6, the calibration constants and mass flow equations for the two meters and the derived density equation are programmed into the microprocessor 135. In addition, density data for pure methane for a range of LNG temperatures is programmed into a look-up table or some other type of database in the microprocessor memory.

As a result, as illustrated in the flow diagram of FIG. 6, upon receipt of temperature data from temperature probe 150 and commencement of dispensing, the microprocessor may test the purity of the LNG by comparing the density computed for the LNG (via the above derived equation) with the density of pure methane at the measured temperature (obtained from the look-up table). A window for acceptable LNG purity may be established so that if the density of the LNG differs significantly from the density of pure methane for the measured temperature, an indication of the presence of impure LNG is provided by the microprocessor and the dispensing of LNG is halted via microprocessor control of valve 134. An example of an acceptable range of deviation in density is +6% to −0%. The outer limit of this range corresponds to LNG having a composition that is 90% methane and 10% ethane.

It should be noted that, while a differential pressure/orifice meter is described for the primary meter and a turbine meter is described for the compensating meter of the embodiment of FIG. 5, a variety of other meter type combinations may be made. For example, a vortex shedding meter, which has a mathematical relation between mass flow and density that is similar to the equation for the turbine meter, may be used as the compensating meter. All that is required is that the primary and compensating meter have differing equations relating mass flow with density so that they may be solved for these two unknowns.

While the preferred embodiments of the invention have been shown and described, it will be apparent to those skilled in the art that changes and modifications may be made therein without departing from the spirit of the invention, the scope of which is defined by the appended claims.

What is claimed is:

1. A method of measuring a mass flow of a cryogenic liquid dispensed through a primary meter and a compensating meter comprising the steps of:
    a) measuring a first characteristic of the cryogenic liquid with the primary meter;
    b) measuring a second characteristic of the cryogenic liquid with the compensating meter;
    c) calculating a density of the dispensed cryogenic liquid using the first characteristic from step a) and the second characteristic from step b); and
    d) calculating the mass flow of dispensed cryogenic liquid using the density from step c).

2. The method of claim 1 wherein the first characteristic of step a) is a change in pressure across the primary meter and the second characteristic of step b) is a frequency of cryogenic liquid flow through the compensating meter.

3. The method of claim 1 further comprising the steps of:
    e) providing a sump containing cryogenic liquid to be dispensed;
    f) measuring the temperature of the cryogenic liquid in the sump;
    g) using the temperature from step f) to obtain the density of a pure cryogenic liquid; and
    h) comparing the densities of steps c) and g) to determine a purity of the cryogenic liquid.

4. The method of claim 3 wherein the first characteristic of step a) is a change in pressure across the primary meter and the second characteristic of step b) is a frequency of cryogenic liquid flow through the compensating meter.

* * * * *